(12) United States Patent
Lin (10) Patent No.: US 10,334,283 B2
(45) Date of Patent: *Jun. 25, 2019

(54) INTERACTIVE SYSTEM FOR VIRTUAL CINEMA AND METHOD

(71) Applicant: NANNING FUGUI PRECISION INDUSTRIAL CO., LTD., Nanning (CN)

(72) Inventor: Po-Yu Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,939

(22) Filed: May 29, 2018

(65) Prior Publication Data

US 2018/0376170 A1    Dec. 27, 2018

Related U.S. Application Data

(63) Continuation-in-part of application No. 15/428,223, filed on Feb. 9, 2017, now Pat. No. 10,045,086.

(51) Int. Cl.
| | |
|---|---|
| *G06F 3/00* | (2006.01) |
| *G06F 13/00* | (2006.01) |
| *H04N 5/445* | (2011.01) |
| *H04N 7/16* | (2011.01) |
| *H04N 21/2225* | (2011.01) |
| *G06F 3/01* | (2006.01) |
| *G02B 27/01* | (2006.01) |
| *H04L 12/18* | (2006.01) |

(52) U.S. Cl.
CPC ....... *H04N 21/2225* (2013.01); *G02B 27/017* (2013.01); *G06F 3/011* (2013.01); *H04L 12/1822* (2013.01)

(58) Field of Classification Search
CPC ............. H04N 21/4788; H04N 21/239; H04N 21/26291; H04N 21/42203; H04N 21/4312; H04N 21/4882; H04N 21/6143; H04N 21/84; H04N 21/845; G06F 3/012; G10L 15/22; G10L 2015/223
See application file for complete search history.

(56) References Cited

U.S. PATENT DOCUMENTS

| 10,045,086 B1 * | 8/2018 | Lin ................... H04N 21/4788 |
|---|---|---|
| 2005/0234750 A1 | 10/2005 | Attebury et al. |
| 2011/0225519 A1 * | 9/2011 | Goldman ............... G06F 3/0481 715/757 |
| 2013/0027296 A1 * | 1/2013 | Klein ...................... G06F 3/017 345/156 |
| 2014/0007170 A1 * | 1/2014 | Klappert ................ G06Q 50/01 725/97 |
| 2014/0229390 A1 * | 8/2014 | Morris ................. G06Q 10/103 705/302 |

(Continued)

*Primary Examiner* — Kyu Chae
(74) *Attorney, Agent, or Firm* — ScienBiziP, P.C.

(57) ABSTRACT

A virtual cinema interactive system includes a server and at least two user terminals. The user terminals communicate with the server. An host can invite his friends to watch film together on a virtual cinema displayed on each user terminal, and distribution of virtual cinema seating, talking between film watchers, and film watcher reactions to the film can be recognized and facilitated. A virtual cinema interactive method is also disclosed.

17 Claims, 7 Drawing Sheets

(56) References Cited

U.S. PATENT DOCUMENTS

| | | | |
|---|---|---|---|
| 2015/0244981 A1* | 8/2015 | Johnson | H04N 7/15 348/14.07 |
| 2015/0341695 A1* | 11/2015 | Pattan | H04L 12/1822 725/86 |
| 2017/0041658 A1* | 2/2017 | Mattingly | G06Q 10/10 |

* cited by examiner

| 12 | 6 | 3 | 5 | 11 |
|---|---|---|---|---|
| 12 | 2 | Myself | 1 | 9 |
| 12 | 8 | 4 | 7 | 13 |

FIG. 3

| Inviter | Invitee | | | | |
|---|---|---|---|---|---|
| | Best friend class | | | General friend class | |
| A | B3 | C4 | D5 | 12 | F2 |

FIG. 4

| | B3 | F2 |
|---|---|---|
| C4 | A | D5 |
| | E3 | |

FIG. 5

| Inviter | Invitee | | | | | |
|---|---|---|---|---|---|---|
| | Best friend class | | | General friend class | | Friends who do not invite other pepole | Friends who invite other pepole |
| A | B3 | C4 | D5 | E3 | F2 | C4, E3 | D5, B3, F2 |
| B3 | G7 | H3 | | I5 | | G7, I5 | H3 |
| D5 | J5 | | | K4 | | J5, K4 | |
| F2 | L9 | M7 | | N3 | | L9, M7, N3 | |
| H3 | O3 | P6 | | | | O3, P6 | |

FIG. 6

| K4 | D5 | J5 | M7 | |
|---|---|---|---|---|
| K3 | A | C4 | F2 | L9 |
| I5 | B3 | G7 | N3 | |
| O3 | H3 | P6 | | |

INTERACTIVE SYSTEM FOR VIRTUAL CINEMA AND METHOD

CROSS-REFERENCE TO RELATED APPLICATIONS

The application is a continuation-in-part of and claims priority under 35 U.S.C. § 120 to U.S. application Ser. No. 15/428,223, filed Feb. 9, 2017, the contents of which are incorporated by reference herein.

FIELD

The subject matter herein generally relates to virtual cinemas.

BACKGROUND

Virtual reality technology has advanced substantially and offers virtual interaction for products and services to a wide variety of audiences. For example, virtual reality devices can display virtual cinemas to a user through a headset for the user to watch films and videos on a virtual cinema. However, when the user watches films or videos through the virtual reality device, the user does not have the option to invite friends to watch the film or video.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the s described herein. However, it will be understood by those of ordinary skill in the art that the s described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the s described herein.

A definition that applies throughout this disclosure will now be presented.

The term "comprising" means "including, but not necessarily limited to"; it specifically indicates open-ended inclusion or membership in a so-described combination, group, series, and the like.

Figure 1:
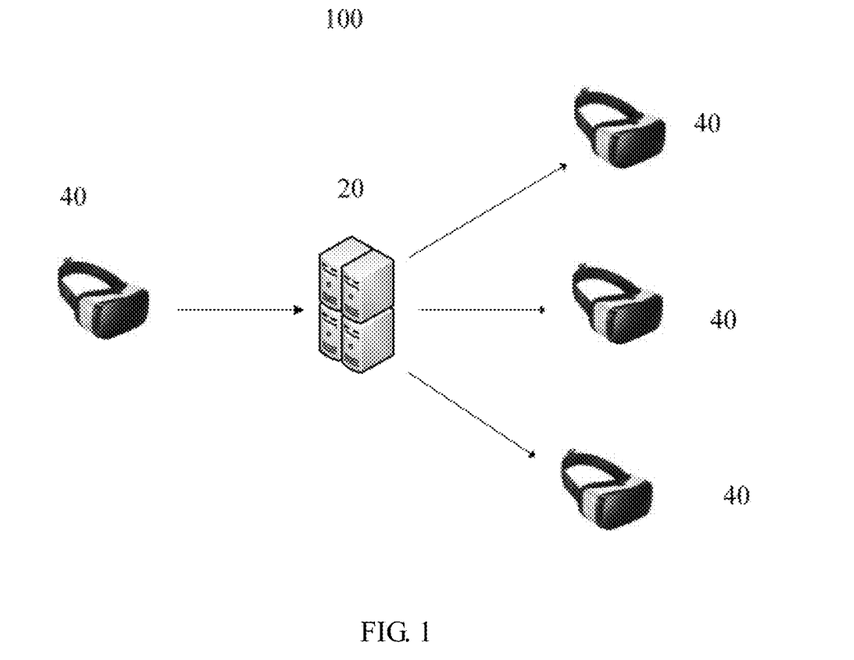
FIG. 1 is a schematic diagram of an embodiment of a virtual cinema interactive system.
Figure 2:
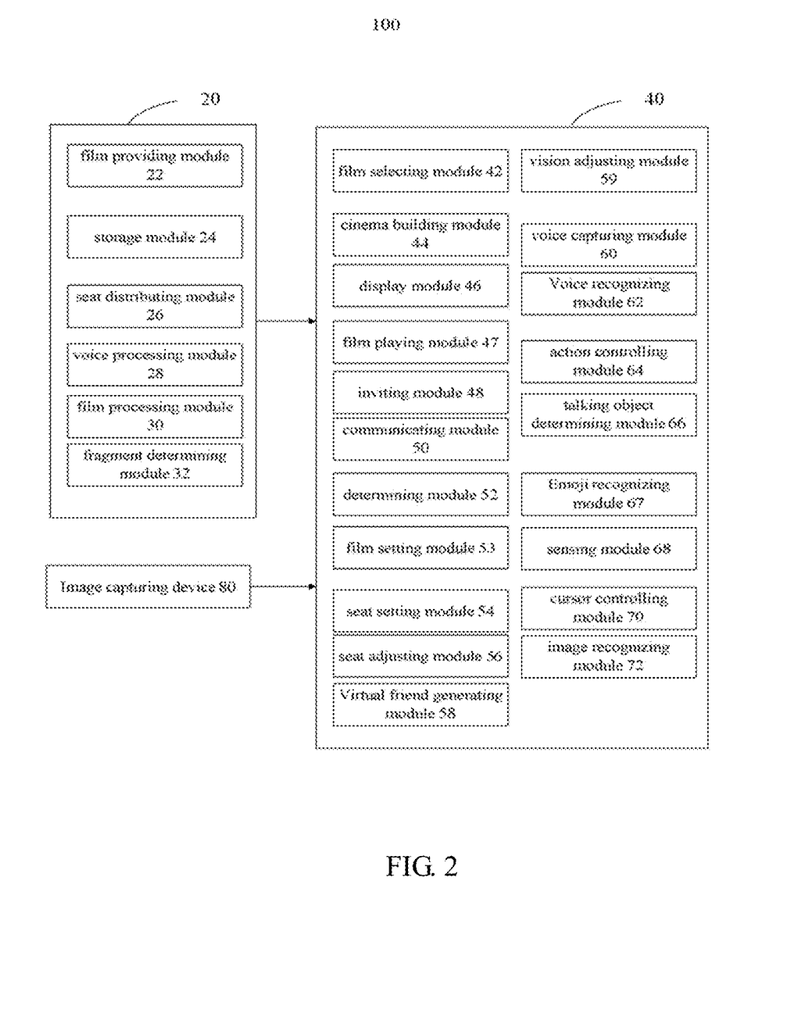
FIG. 2 is a block diagram of the virtual cinema interactive system of FIG. 1.

FIGS. 1-2 illustrate an embodiment of a virtual cinema interactive system 100 which includes a server 20 and a number of user terminals 40. The virtual cinema interactive system 100 provides a virtual cinema, and the users can watch a film together and interact with each other while watching the film on the virtual cinema. A number of modules are executed in the server 20 and the user terminal 40, each module containing a number of programs. The modules include a film providing module 22, a film selecting module 42, a virtual cinema forming module 44, a display module 46, a film playing module 47, an inviting module 48, a communicating module 50, a determining module 52, a film setting module 53, a storage module 24, a virtual seat selecting module 54, a seat assigning module 26, a seat assignment module 56, a virtual friend generating module 58, and a vision adjusting module 59.

The film providing module 22 provides film information and film data. The film information includes film name and film introduction. The film data includes film audio and video. The film selecting module 42 provides an interface for a host to select the film. The virtual cinema forming module 44 forms the virtual cinema. The virtual cinema includes a virtual film screen and a number of virtual seats. The display module 46 displays the virtual cinema. In response to selection of a play film operation, the film playing module 47 plays the selected film on the virtual film screen.

The inviting module 48 provides a friend invitation interface for the host. The host can then select friends, and the host and friends can watch the film together. The communicating module 50 transmits information on the host and the friends invited by the user (hereinafter called "invitee") to the server 20. The server 20 transmits the information on the host and the invitation to watch a film to the invitee. In response to an invitee's operation (e.g. accept invitation or decline invitation), the determining module 52 determines whether the invitation of the host is accepted.

The communicating module 50 further transmits the information on the selected film to the server 20. The server 20 further transmits the information on the selected film to the invitee. Thus, the invitee can decide to accept or decline the invitation of the host based on the selected film.

The film setting module 53 provides a film setting interface for the host to set a playing time of the selected film. The playing time may be one hour from now or right now. The server 20 transmits the playing time of the selected film to the invitee. Thus, the invitee can decide to accept or decline the invitation of the host regarding the playing time of the selected film.

The virtual seat selecting module 54 provides a virtual seat selecting interface for the host. The host can then define a friend class among the invitees, and the defined friend class determines priority seating assignments for each invitee in the virtual cinema. The storage module 24 stores the number of chat communications made by the invitee to the host. According to the invitee, the friend class of each invitee, the number of chat communications, the priority of virtual seats, and a seat distribution chart, the virtual seat assigning module 26 can determine how to distribute seats amongst the invitees. The friend class includes a best friend class and a general friend class. The virtual seat assignment module 56 provides a seat assignment interface for the invitee to adjust the distribution and number of virtual seats. Thus, when the invitee is not satisfied with the assigned seat, the invitee can change the virtual seat. In the virtual reality, the virtual friend generating module 58 generates a portrait of the friend positioned in the assigned seat.

After accepting the invitation, the invitee also can invite his friends through the inviting module 48 and set friend classes and his priority of virtual seats in the virtual cinema, through the virtual seatvirtual seat selecting module 54.

Figure 3:
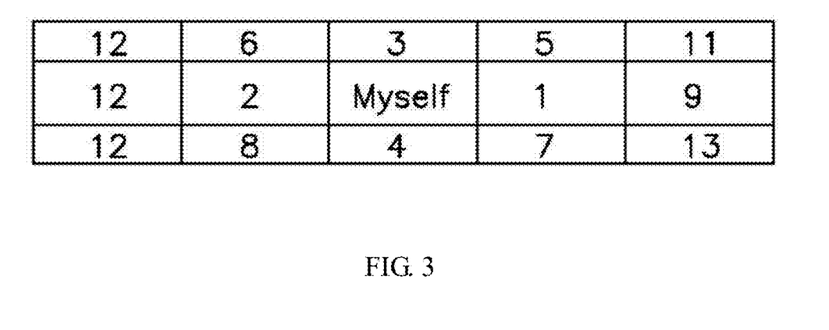
FIG. 3 is a schematic diagram of a priority of virtual seats in the system of FIG. 1.

When all of the invitees do not invite a friend to watch the film, the virtual seat distribution chart is that of preferential seat distribution to the invitee with a higher friend class ranking. When the friend class rankings are the same, preferentially seat distribution assigns seats to the invitee having the most communications with the host. Referring to FIG. 3, the host setting the priority of virtual seats in the virtual cinema is that the first seat on the left of the host seat is number one seat, the first seat on the right of the host seat is number two seat, the second seat on the left of the host seat is number three seat, the second seat on the right of the host seat is number four seat, the first seat in front of the host seat is number five seat, and so on.

Figure 4:
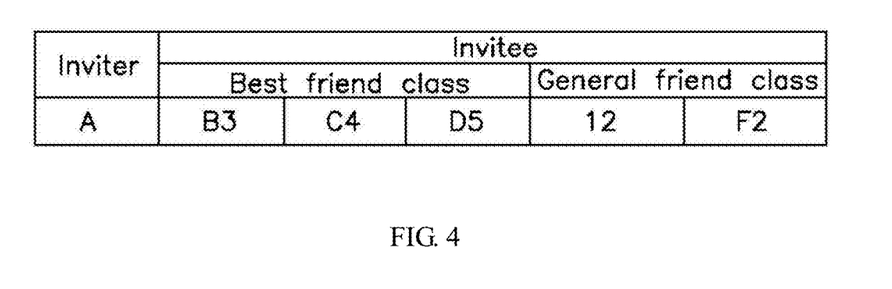
FIG. 4 is a schematic diagram of information on invitees in the system of FIG. 1, according to a first embodiment.

Referring to FIG. 4, the host A invites invitees B3, C4, D5, E3, and F2 to watch film. The letter in the B3, C4, D5, E3, and F2 represents invitee identities. The number in the B3, C4, D5, E3, and F2 represent number of chat communication made by the invitee to the host. The invitees B3, C4, D5 are best friend class. The invitees E3 and F2 are general friend class. When assigning a virtual seats, the invitees B3, C4, D5 are given preferentially assigned seats, and according to number of chat communications between the invitee to the host, seats are distributed in turn to the invitees D5, C4, B3. Then, according to number of chat communications between the invitee to the host, seats are distributed in turn to general friends E3, and F2. Thus, the B3, C4, D5, E3, and F2 are given number three seat, number two seat, number one seat, number four seat, and number five seat. The virtual seats of hosts and invitees are shown in FIG. 5.

When an invitee invites his friend to watch the film, the virtual seat distribution chart is that a first preferentially assigned seat is given to the invitee who does not invite his friend, a second preferentially assigned seat is given to the invitee who invites his friend and belongs to best friend class, a third preferentially assigned seat is given to the invitee invited by an invitee belong to best friend class, a fourth preferentially assigned seat is given to the invitee who invites his friend and belongs to general friend class. A fifth preferentially assigned seat is given to the invitee invited by an invitee belonging to general friend class, and when the invitee is in a same priority level, a preferentially assigned seat is given to the invitee having talked the most times to the host.

Figure 5:
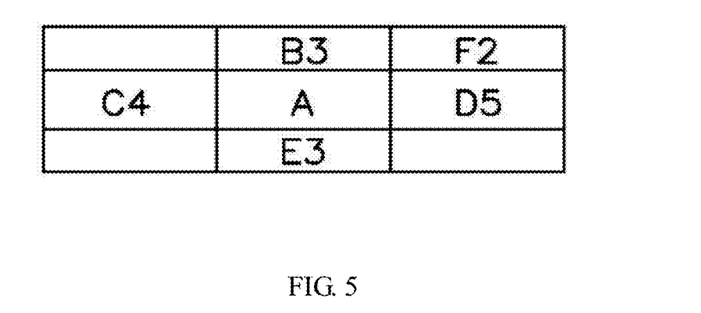
FIG. 5, with reference to FIG. 4, is a schematic diagram of virtual seats of hosts and invitees.
Figure 6:
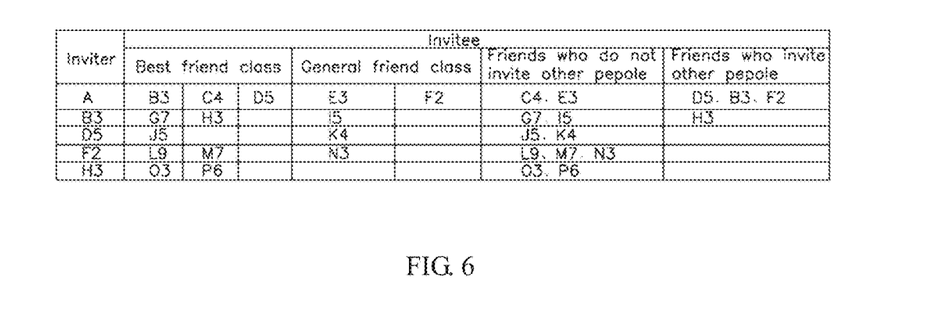
FIG. 6 is a schematic diagram of information on invitees in the system of FIG. 1, according to a second embodiment.

Referring to FIG. 5, invitees can invite their friends. In the embodiment, the host and the invitee who invites friends set a same priority of virtual seats as shown in FIG. 3. In other embodiment, the host and the invitee who invite friends are set different priorities of virtual seats. Referring to FIG. 6, the host A invites invitees B3, C4, D5, E3, and F2 to watch film. The invitees C4 and E3 do not invite friends but the invitees B3, D5, and F2 do invite friends.

Figure 7:
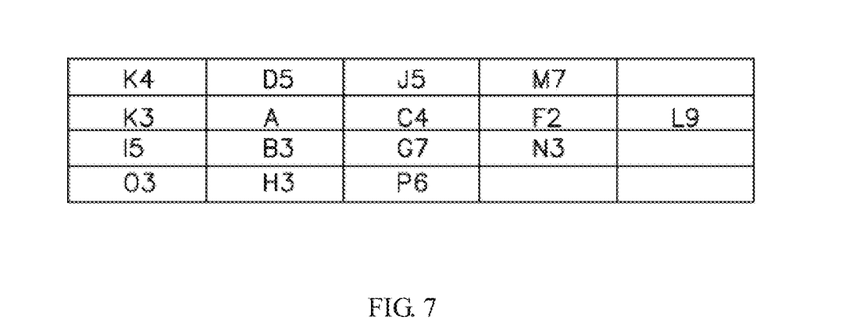
FIG. 7, referring to FIG. 6, is a schematic diagram of virtual seats of hosts and invitees.

Referring to FIG. 7, when assigning a virtual seats, first, according to a preferential assignment of virtual seats to the invitee who does not invite his friend, assigning a virtual seats to C4 and E3, who do not invite friends, and according to when the invitee is in a same priority level, preferentially assigning a virtual seats to the invitee having talked the most times to the host, thus assigning number one seat to C4 and assigning number two seat to E3.

Second, according to a second preferential assignment of virtual seats to the invitee who invites his friend and belongs to best friend class, assigning a virtual seats to D5 and B3, and according to when the invitee is in a same priority level, preferentially assigning a virtual seat to the invitee having talked the most times to the host, thus assigning number three seat to D5 and assigning number four seat to B3.

Third, according to a third preferential assignment of virtual seats to the invitee invited by an invitee belonging to best friend class and when the invitee is in a same priority level, preferentially assigning a virtual seat to the invitee having talked the most times to the host, thus assigning a virtual seats to J5 and K4 who are invited by host D5 who is best friend of A to number one seat and number two seat of host D5. Seats are also assigned to G7, I5, H3 who are invited by host B3 who is best friend of A, to number one seat, number two seat, and number three seat of host B3. Number three seat of B3 has been assigned to other people and number four seat of host B3 assigned to H3.

Fourth, according to a fourth preferential assignment of virtual seats to the invitee who invites his friend and belongs to general friend class, thus assigning a virtual seats to F2, because numbers one to eight seats have been assigned to other people, and number nine seat of host A assigned to F2.

Fifth, according to a fifth preferential assignment of virtual seats to the invitee invited by an invitee belong to general friend class and when the invitee is in a same priority level, preferentially assigning a virtual seats to the invitee having talked the most times talking to the host, thus assigning a virtual seats to L9, M7, and N3 who are invited by host F2 who is general friend of A, to number one seat, number two seat, and number three seat of host F2. Since number two seat of F2 has been assigned to C4, number one seat, number three seat, and number four seat of host F2 are assigned to L9, M7, and N3. Therefore, the host A, the invitees B3, C4, D5, E3, F2 invited by A, and the invitees G7, H3, I5, J5, K4, L9, M7, N3 invited by B3, D5, F2 have been given seats.

Finally, according to when the invitee is in a same priority level, preferentially assigning a virtual seats to the invitee having talked the most times to the host, thus the invitees O3 and P6 invited by H3 are given number one seat and number two seat of H3. Therefore, seats are given to all of the people.

Figure 8:
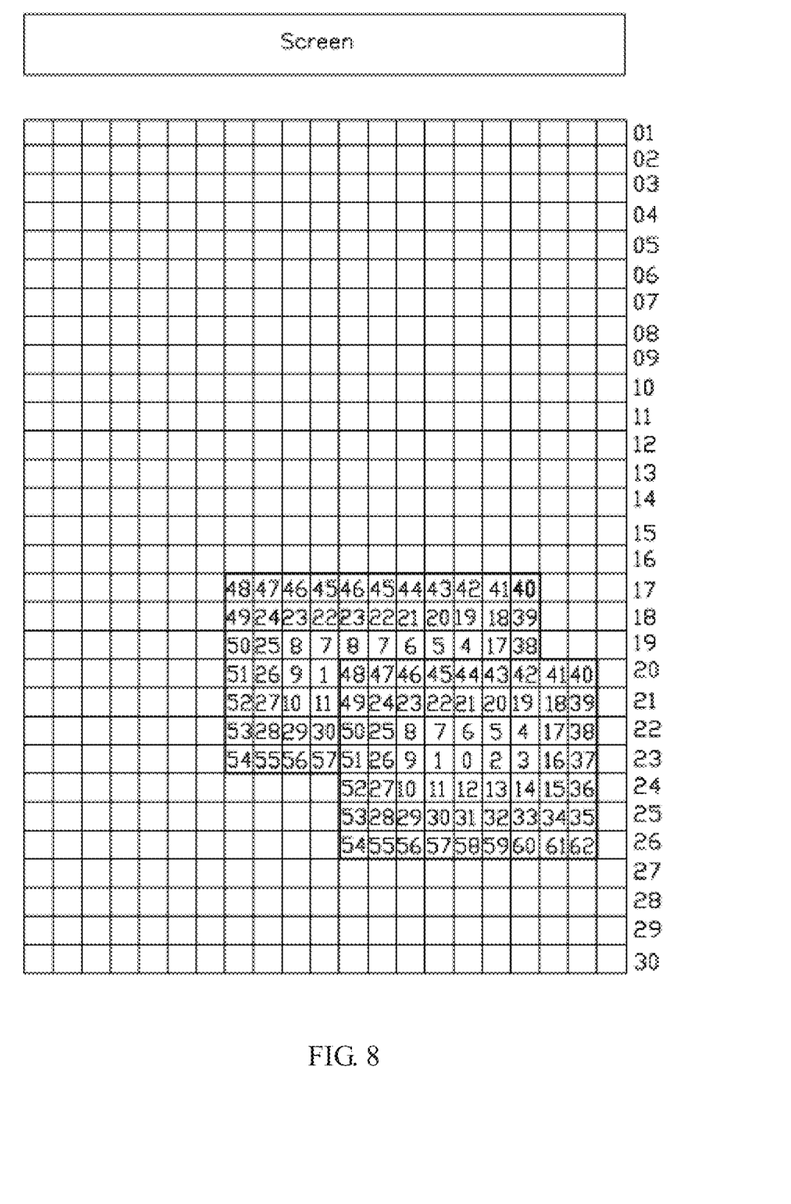
FIG. 8 is a schematic diagram of vision being adjusted in the system of FIG. 1.

Referring to FIG. 8, the vision adjusting module 59 keeps a relative position between the host's seat and the invitee's seat, and adjusts each people's seat to be a center seat of all the virtual seats in the virtual cinema. Thus, the host and the invitees can all get a good view of the screen.

Further referring to FIG. 2, the virtual cinema interactive system 100 further includes a voice capturing module 60, a voice recognizing module 62, an action controlling module 64, and a voice processing module 28. The voice capturing module 60 captures a person's voice. The person can be the host or the invitee. The communicating module 50 transmits the information on the person and the captured voice to the server 20. In accordance with the information on the person, the server 20 transmits the captured voice to the friends of the person. The voice recognizing module 64 recognizes special noises, for example, applause, snoring, screaming, and so on. The action controlling module 64 controls virtual friend portraits to act corresponding to the special noise. For example, the voice recognizing module 64 recognizes applause and the action controlling module 64 controls that virtual friend portrait to clap his hands. According to the relative position between the person's seat and his friend's seat, the voice processing module 28 determines intensity of the voice or noise.

The virtual cinema interactive system 100 further includes talking object determining module 66. The voice recognizing module 62 further recognizes a name of a friend spoken by a voice. The talking object determining module 66 determines the person who has same name as the recognized name. The communicating module 50 transmits the identified target person to the server. The server 20 transmits the voice to the identified target person.

The virtual cinema interactive system 100 further includes an emoji recognizing module 67. The display module 46 displays a list of emoji icons on a screen of the user terminal 40. Following the rotation of the person's head, the cursor controlling module 70 controls the cursor to move on the list. The emoji recognizing module 67 recognizes an emoji icon selection by a person. The person is the host or the invitee. The communicating module 50 transmits the information on the person and the selected emoji icon to the server 20, the server 20 transmits the selected emoji icon to the friends of the person according to the information on the person.

The emoji recognizing module 67 recognizes the selected emoji icon, and the action controlling module 64 controls corresponding virtual friend portrait to do or display action corresponding to the selected emoji icon. For example, when the person selects an emoji icon of "tired", the action controlling module 64 controls corresponding virtual friend portrait of the person to do an action as being sleeping, and displays the action for the friends of the person according to the information on the person.

The virtual cinema interactive system 100 further includes a sensing module 68 and a cursor controlling module 70. The sensing module 68 senses a rotation of the person's head. The cursor controlling module 70 controls a cursor to move to a virtual friend portrait following the rotation of the person's head. When the cursor is kept on the virtual friend portrait for longer than a preset time, the talking object determining module 66 determines the person is talking to the friend corresponding to the portrait of the friend.

The server 20 further transmits the information on the person who is talking to the target person. The display module 46 displays the information on the person on a screen of the user terminal held by the target person. When the person's information is displayed on such screen, the target person can rotate his head to make the cursor move on the person's information to talk to the person. The person's information includes a picture of the person's head.

The virtual cinema interactive system 100 further includes an image capturing device 80 and an image recognizing module 72. The capturing device 80 communicates with the user terminal 40. The image capturing device 80 captures a person's image and transmits the person's image to a corresponding user terminal 40. The person can be the host or the invitee. The image recognizing module 72 recognizes an action of the person. According to the action of the person, the action controlling module 64 controls the portrait to do corresponding action, for example, stretching or yawning.

After playing the film, the display module 46 displays a sharing icon. Following the rotation of the person's head, the cursor controlling module 70 controls the cursor to move on the sharing icon. In response to a sharing operation on the sharing icon, the action controlling module 64 controls the portrait to move before the virtual film screen in a preset speed. The voice capturing module 60 captures the voice about reactions to the film. The communicating module 50 transmits the voice expressing feelings about the film to the server 20. The server 20 transmits such vocal expressions to the host and the invitee in the virtual cinema. Thus, the host and the invitee in the virtual cinema can hear the reaction of others to the film.

The virtual cinema interactive system 100 further includes a film processing module 30, a fragment determining module 32, and a fragment playing module 74. The film processing module 30 segments the film into a number of fragments and sets keywords for each fragment. The fragment determining module 32 determines the film fragment which has the keyword spoken by the person. The display module 46 displays the determined film fragment. Following the rotation of the person's head, the cursor controlling module 70 controls the cursor to move onto one or more of the determined film fragments. In response to spoken keywords, the film playing module 47 plays the one or more film fragments.

In the embodiment, the film providing module 22, the storage module 24, the virtual seat assigning module 26, the voice processing module 28, the film processing module 30, and the fragment determining module 32 are executed in the server 20. The film selecting module 42, the virtual cinema forming module 44, the display module 46, the film playing module 47, the inviting module 48, the communicating module 50, the determining module 52, the film setting module 53, the virtual seatvirtual seat selecting module 54, the virtual seat assignment module 56, the virtual friend generating module 58, the vision adjusting module 59, the voice capturing module 60, the voice recognizing module 62, the action controlling module 64, the talking object determining module 66, the emoji recognizing module 67, the sensing module 68, the cursor controlling module 70, and the image recognizing module 72 are executed in the user terminal 40. In another embodiment, the storage module 24 and the virtual seat assigning module 26 are also executed in the server 20.

Figure 9:
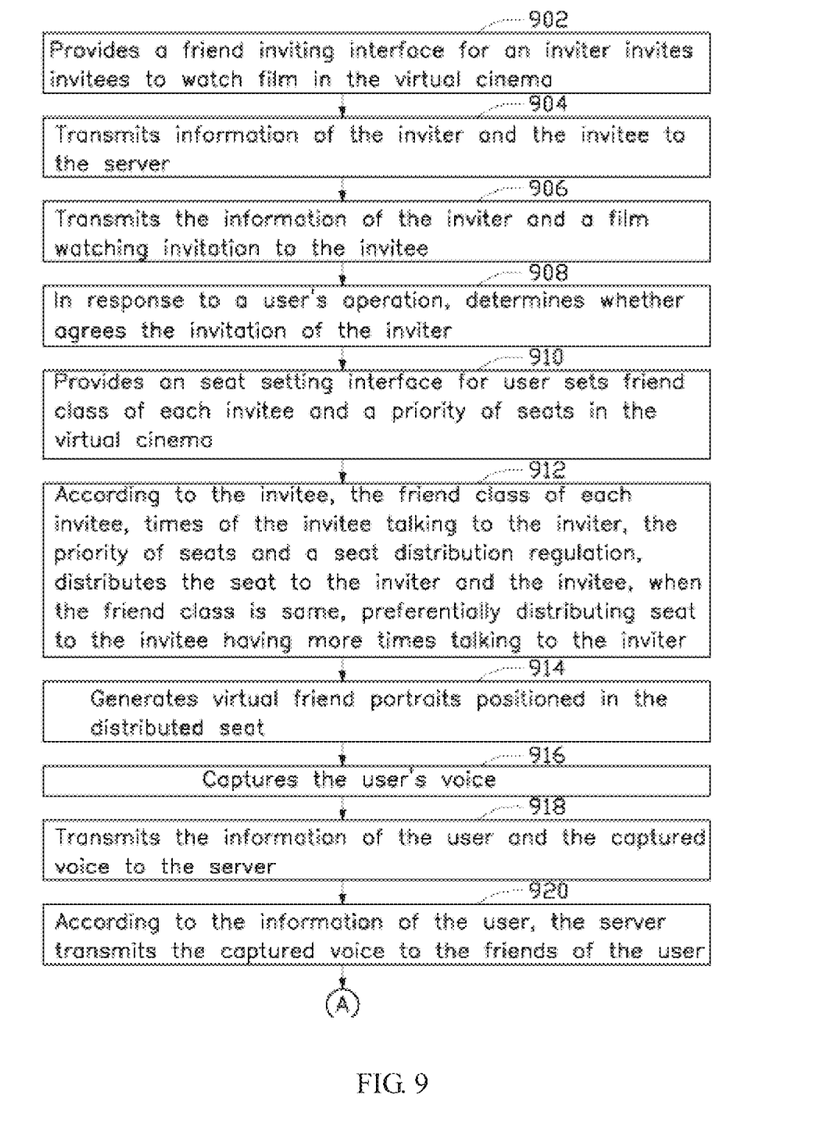
FIG. 9 is a flowchart of an virtual cinema interactive method.
Figure 10:
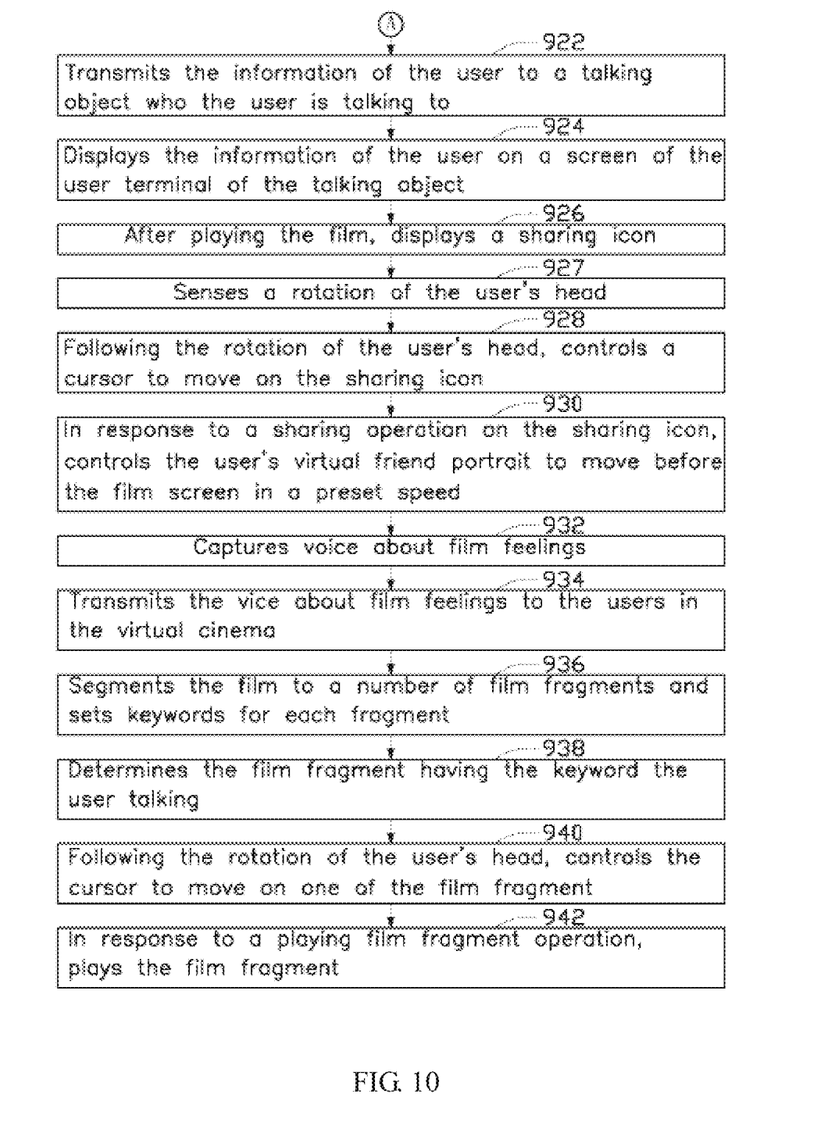
FIG. 10 is another flowchart of an virtual cinema interactive method.

FIGS. 9-10 illustrate a virtual cinema interactive method. The order of blocks in FIG. 9 is illustrative only and the order of the blocks can change. Additional blocks can be added or fewer blocks may be utilized without departing from this disclosure. The method begins at block 902.

At block 902, the inviting module 48 provides a friend invitation interface for an host invites invitees to watch film in the virtual cinema.

At block 904, the communicating module 50 transmits information on the host and the invitee to the server 20.

At block 906, the server 20 transmits the information on the host and a film watching invitation to the invitee.

At block 908, in response to an host's operation, the determining module 52 determines whether agrees the invitation of the host.

At block 910, the film setting module 53 provides an virtual seat selecting interface for the host sets friend class among the invitees and a priority of virtual seats for each invitee in the virtual cinema.

At block 912, according to the invitee, the friend class of each invitee, number of chat communications made by the invitee to the host, the priority of virtual seats and a seat distribution chart, the virtual seat assigning module 26 distributes the virtual seat to the host and the invitee, when the friend class is same, preferentially seat distribution assigns seats to the invitee having the most communications with to the host.

At block 914, the virtual friend generating module 58 generates virtual friend portraits positioned in the assigned seat.

At block 916, the voice capturing module 60 captures a person's voice, the person can be the host or the invitee.

At block 918, the communicating module 50 transmits the information on the person and the captured voice to the server 20.

At block 920, according to the information on the person, the server 20 transmits the captured voice to his friends.

At block 922, the server 20 transmits the information on the person to a talking object who the person is talking to.

At block 924, the display module 46 displays the information on the person on a screen of the user terminal 40 of the talking object.

At block 926, after playing the film, the display module 46 displays a sharing icon.

At block 927, the sensing module 68 senses a rotation of the person's head.

At block 928, following the rotation of the person's head, the cursor controlling module 70 controls a cursor to move on the sharing icon.

At block 930, in response to a sharing operation on the sharing icon, the action controlling module 64 controls the person's virtual friend portrait to move before the virtual film screen in a preset speed.

At block 932, the voice capturing module 60 captures voice about film feelings.

At block 934, the server 20 transmits the voice about film feelings to the host and the invitee in the virtual cinema.

At block 936, the film processing module 30 segments the film to a number of film fragments and sets keywords for each fragment.

At block 938, the fragment determining module 32 determines the film fragment having the keyword the person talking.

At block 940, following the rotation of the person's head, the cursor controlling module 70 controls the cursor to move on one of the film fragment.

At block 942, in response to a playing film fragment operation, the film playing module 47 plays the film fragment.

The shown and described above are only examples. Even though numerous characteristics and advantages of the present disclosure have been set forth in the foregoing description, together with details of the structure and function of the present disclosure, the disclosure is illustrative only, and changes may be made in the detail, comprising in matters of shape, size, and arrangement of the parts within the principles of the present disclosure, up to the full extent established by the broad general meaning of the terms used in the claims.

What is claimed is:

1. A virtual cinema interactive system comprising:
a server;
the server comprising:
at least one processor;
a non-transitory storage system coupled to the at least one processor and configured to store one or more programs to be executed by the at least one processor, the one or more programs including instructions for:
providing film information and film data;
forming a virtual cinema, the virtual cinema comprising a virtual film screen and a plurality of virtual seats;
displaying the virtual cinema;
providing an invitation interface for an host to select an invitee from invitees to join in watching the film;
transmitting information on the host and the invitee invited by the host to the server;
transmitting the information on the host and a film invitation to the invitee;
determining whether the invitee agrees to the invitation of the host in response to the invitee's operation;
providing a virtual seat selecting interface for the host to set a class of friend in relation to each invitee and a priority of virtual seats in the virtual cinema;
storing times of the invitee talking to the host;
assigning the virtual seat to the host and the invitee according to: the invitee, the class of friend in relation to each invitee, the times, the priority of virtual seats and a seat distribution chart;
generating virtual friend portraits positioned in the assigned seat;
wherein the non-transitory storage system is further configured to recognize an emoji icon selected by a person, the person is the host or the invitee, transmit the information on the person and the selected emoji icon to the server, transmit the selected emoji icon to the friends of the person according to the information on the person; and
wherein the non-transitory storage system is further configured to recognize the selected emoji icon, and control corresponding virtual friend portrait to do or display action corresponding to the selected emoji icon;
wherein the non-transitory storage system is further configured to capture a person's voice, the person is the host or the invitee, transmit the information on the person and the captured voice to the server, according to the information on the person, transmit the captured voice to the friends of the person;
wherein the non-transitory storage system is further configured to play the film, after playing the film, display a sharing icon, follow the rotation of the person's head, control the cursor to move on the sharing icon, in response to a sharing operation on the sharing icon, control the person's virtual friend portrait to move before the virtual film screen in a preset speed, capture the voice about film feelings, transmit the voice about film feelings to the server, the server transmits the voice about film feelings to the host and the invitee in the virtual cinema.

2. The virtual cinema interactive system as claimed in claim 1, wherein after agreeing to the invitation, the invitee also can invite his friends and sets classes of friends and his priority of virtual seats in the virtual cinema.

3. The virtual cinema interactive system as claimed in claim 1, wherein the class of friend comprises a best friend class and a general friend class, when an invitee invites his friend to watch the film, the virtual seat distribution chart is that a first preferentially assigning a virtual seat to the invitee who does not invite his friend, a second preferentially assigning a virtual seat to the invitee who invites his friend and belongs to best friend class, a third preferentially assigning a virtual seat to the invitee invited by an invitee belong to best friend class, a fourth preferentially assigning a virtual seat to the invitee who invites his friend and belongs to general friend class, a fifth preferentially assigning a virtual seat to the invitee invited by an invitee belong to general friend class, and when the invitee is in a same priority level, preferentially assigning a virtual seat to the invitee having the most times talking to the host.

4. The virtual cinema interactive system as claimed in claim 2, wherein when none of the invitees invites his friend to watch the film, the virtual seat distribution chart is that of preferentially assigning of seat to the invitee having a higher ranking of the class of friend, and when the class of friend is same, preferentially assigning a virtual seat to the invitee having the most times talking to the host.

5. The virtual cinema interactive system as claimed in claim 4, wherein all of the hosts set a same priority of virtual seats.

6. The virtual cinema interactive system as claimed in claim 1, wherein the non-transitory storage system is further configured to provide a film setting interface for host to set a playing time of the selected film, the server transmits the playing time of the selected film to the invitee.

7. The virtual cinema interactive system as claimed in claim 1, wherein the playing time is configurable through the file setting interface.

8. The virtual cinema interactive system as claimed in claim 1, wherein the non-transitory storage system is further configured to transmit the information on the selected film to the server, the server further transmits the information on the selected film to the invitee.

9. The virtual cinema interactive system as claimed in claim 1, wherein the non-transitory storage system is further configured to keep a relative position between the host's virtual seat and the invitee's virtual seat, and adjusts each person's virtual seat to a center virtual seat of the virtual seats in the virtual cinema.

10. The virtual cinema interactive system as claimed in claim 1, wherein the non-transitory storage system is further configured to recognize special voice, control corresponding virtual friend portrait to do action corresponding to the special voice.

11. The virtual cinema interactive system as claimed in claim 10, wherein the special voice is applause, the non-transitory storage system is further configured to control corresponding virtual friend portrait to clap his hands.

12. The virtual cinema interactive system as claimed in claim 1, wherein the non-transitory storage system is further configured to sense a rotation of the person's head, control a cursor to move on a virtual friend portrait following the rotation of the person's head, when duration of the cursor keeps on the virtual friend portrait longer than a preset time, determine the person will talks to a talking object corresponding to the virtual friend portrait, the server transmits the voice to the talking object.

13. The virtual cinema interactive system as claimed in claim 1, wherein the non-transitory storage system is further configured to segment the film to a number of film fragments and set keywords for each fragment, determine the film fragment having the keyword the person talking, display the determined film fragment, follow the rotation of the person's head, control the cursor to move on one of the determined film fragment, in response to a playing film fragment operation, play the film fragment.

14. A virtual cinema interactive method comprising:
providing a friend invitation interface for an host to select friends to watch the film together;
transmitting information on the host and a film watching invitation to the invitee;
in response to a user's operation, the invitee deciding to accept or not accept the invitation of the host;
providing a virtual seat selecting interface for the host to set a class of friend in relation to each invitee and a priority of virtual seats in the virtual cinema;
according to: the invitee, the class of friend in relation to each invitee, times of the invitee talking to the host, the priority of virtual seats and a seat distribution chart, assigning the virtual seat to the host and the invitee,
wherein the virtual seat distribution chart comprises when the class of friend is same, preferentially assigning a virtual seat to the invitee having the most times talking to the host;
generating virtual friend portraits positioned in the assigned seat;
wherein the method further comprises:
recognizing an emoji icon selected by a person, the person is the host or the invitee, transmit the information on the person and the selected emoji icon to the server;
transmitting the selected emoji icon to the friends of the person according to the information on the person;
controlling corresponding virtual friend portrait to do or display action corresponding to the selected emoji icon;
after playing the film, displaying a sharing icon;
sensing a rotation of the person's head;
following the rotation of the person's head, controlling a cursor to move on the sharing icon;
in response to a sharing operation on the sharing icon, controlling the person's virtual friend portrait to move before the virtual film screen in a preset speed;
capturing voice about film feelings; and
transmitting the voice about film feelings to the host and the invitee in the virtual cinema.

15. The virtual cinema interactive method as claimed in claim 14, further comprising:
capturing the person's voice; and
transmitting the captured voice to the friends of the person.

16. The virtual cinema interactive method as claimed in claim 15, further comprising:
transmitting the information on the person to a talking object who the person is talking to; and
displaying the information on the person.

17. The virtual cinema interactive method as claimed in claim 14, further comprising:
segmenting the film to a number of film fragments and sets keywords for each fragment;
determining the film fragment having the keyword the person talking;
following the rotation of the person's head, controlling the cursor to move on one of the film fragment; and
in response to a playing film fragment operation, playing the film fragment.

* * * * *